United States Patent
McCready

(10) Patent No.: US 8,376,732 B2
(45) Date of Patent: Feb. 19, 2013

(54) MOLD STACK FOR A PREFORM

(75) Inventor: Derek Robertson McCready, Mississauga (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 274 days.

(21) Appl. No.: 13/003,117

(22) PCT Filed: Jul. 14, 2009

(86) PCT No.: PCT/CA2009/000947
§ 371 (c)(1),
(2), (4) Date: Jan. 7, 2011

(87) PCT Pub. No.: WO2010/017622
PCT Pub. Date: Feb. 18, 2010

(65) Prior Publication Data
US 2011/0111079 A1    May 12, 2011

Related U.S. Application Data

(60) Provisional application No. 61/088,757, filed on Aug. 14, 2008.

(51) Int. Cl.
B29C 45/44    (2006.01)

(52) U.S. Cl. ........................ 425/556; 425/577

(58) Field of Classification Search .................. 425/533, 425/556, 577
See application file for complete search history.

(56) References Cited

U.S. PATENT DOCUMENTS

| | | | |
|---|---|---|---|
| 3,635,635 A * | 1/1972 | Moslo | ........................... 425/533 |
| 4,521,177 A | 6/1985 | Blank et al. | |
| 5,736,173 A | 4/1998 | Wright et al. | |
| 6,413,075 B1 * | 7/2002 | Koch et al. | ..................... 425/533 |
| 6,569,370 B1 | 5/2003 | Amin et al. | |
| 2005/0136150 A1 | 6/2005 | Martin | |

FOREIGN PATENT DOCUMENTS

| | | |
|---|---|---|
| EP | 1647389 A1 | 4/2006 |
| WO | 03/055663 A1 | 7/2003 |

* cited by examiner

*Primary Examiner* — Robert B Davis
(74) *Attorney, Agent, or Firm* — Husky Intellectual Property Services

(57) ABSTRACT

According to embodiments of the present invention, there is provided a stripper assembly and a mold stack incorporating same. More specifically, there is provided the stripper assembly (212) for use in a mold stack (202) for forming a preform (210) suitable for blow-molding into a final-shaped container. The stripper assembly (212) comprises a stripper plate (214) connectable, in use, to a stripper plate actuator; neck rings (220) configured to cooperate to define a portion a neck region (226) of the preform (210); a stripper ring (230) configured to define at least a portion of a top sealing surface of the neck region (226) of the preform (210); the stripper plate (214) being configured to actuate the neck rings (220) and the stripper ring (230), in unison, along substantially the whole length of a complete ejection path, which is substantially parallel to a longitudinal axis of the mold stack (202); and wherein the neck rings (220) are configured for movement in a direction substantially perpendicular to the longitudinal axis of the mold stack, over at a portion of the complete ejection path, whereby at a completion of the complete ejection path, the stripper ring (230) and the neck rings (220) render the preform (210) removable from the mold stack (202).

10 Claims, 4 Drawing Sheets

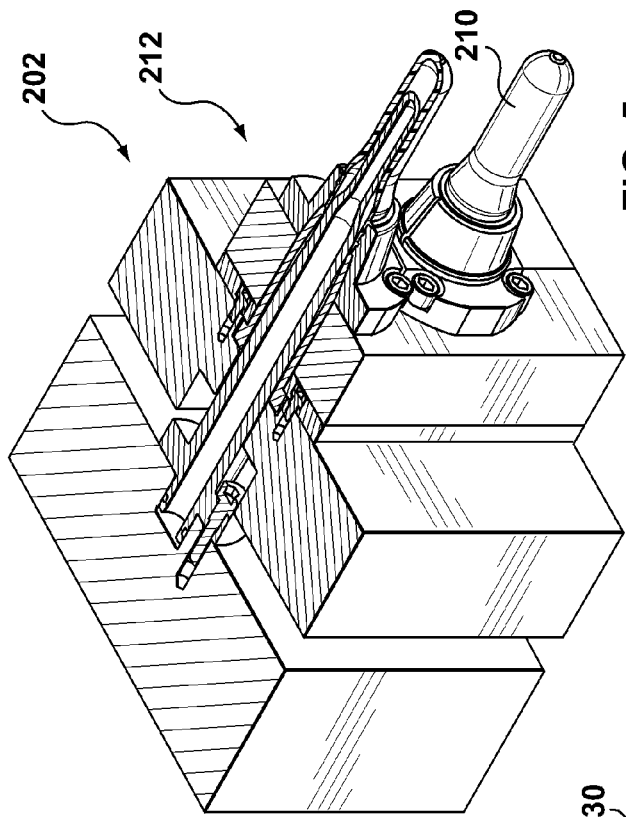
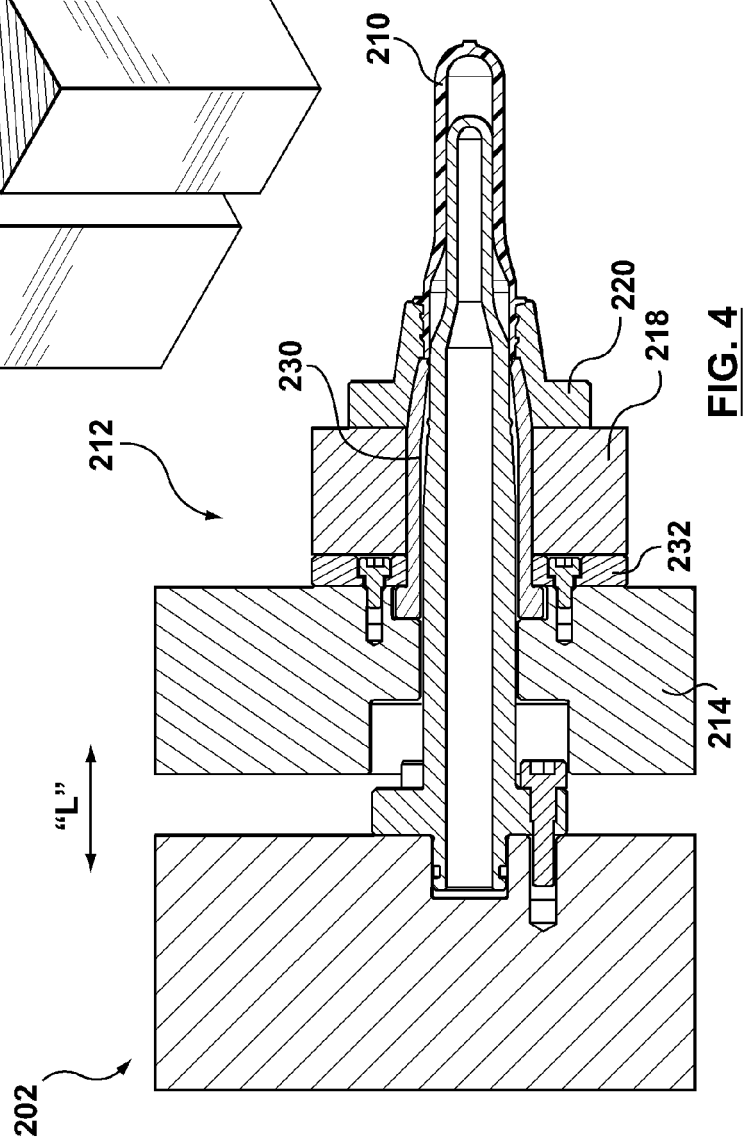

MOLD STACK FOR A PREFORM

TECHNICAL FIELD

The present invention generally relates to, but is not limited to, a molding system, and more specifically the present invention relates to, but is not limited to, a mold stack for a preform.

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from polyethylene terephthalate (PET) material is a preform that is capable of being subsequently blown into a beverage container, such as, a bottle and the like.

As an illustration, injection molding of PET material involves heating the PET material (or other suitable molding material for that matter) to a homogeneous molten state and injecting, under pressure, the so-melted PET material into a molding cavity defined, at least in part, by a female cavity piece and a male core piece mounted respectively on a cavity plate and a core plate of a mold. The cavity plate and the core plate are urged together and are held together by clamp force, the clamp force being sufficient to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the molding cavity. When cooled, the molded article shrinks inside of the molding cavity and, as such, when the cavity and core plates are urged apart, the molded article tends to remain associated with the core piece. Accordingly, by urging the core plate away from the cavity plate, the molded article can be subsequently demolded by ejecting it off the core piece. Ejection structures are known to assist in removing the molded articles from the core halves. Examples of the ejection structures include stripper plates, stripper rings and neck rings, ejector pins, etc.

When dealing with molding a preform that is capable of being subsequently blown into a beverage container, one consideration that needs to be addressed is forming a so-called "neck region". Typically and as an example, the neck region includes (i) threads (or other suitable structure) for accepting and retaining a closure assembly (ex. a bottle cap), and (ii) an anti-pilferage assembly to cooperate, for example, with the closure assembly to indicate whether the end product (i.e. the beverage container that has been filled with a beverage and shipped to a store) has been tampered with in any way. The neck region may comprise other additional elements used for various purposes, for example, to cooperate with parts of the molding system (ex. a support ledge, etc.). As is appreciated in the art, the neck region can not be easily formed by using the cavity and core halves. Traditionally, split mold inserts (sometimes referred to by those skilled in the art as "neck rings") have been used to form the neck region.

With reference to FIG. 1, a section along a portion of an injection mold 50 illustrates a typical molding insert stack assembly 52 that can be arranged (in use) within a molding machine (not depicted). The description of FIG. 1 that will be presented herein below will be greatly simplified, as it is expected that one skilled in the art will appreciate configuration of other components of the injection mold 50 that will not be discussed in the following description.

The molding insert stack assembly 52 includes a split mold insert pair 54 that together with a mold cavity insert 56, a gate insert 58 and a core insert 60 defines a molding cavity 62. Molding material can be injected into the molding cavity 62 from a source of molding material (not depicted) via a receptacle (not separately numbered) in the gate insert 58 to form a molded article. In order to facilitate forming of the neck region of the molded article and subsequent removal of the molded article therefrom, the split mold insert pair 54 comprises a pair of complementary split mold inserts (not separately numbered) that are mounted on adjacent slides of a slide pair (not depicted). The slide pair is slidably mounted on a top surface of a stripper plate (not depicted). As commonly known, and as, for example, generally described in U.S. Pat. No. 6,799,962 to Mai et al (granted on Oct. 5, 2004), the stripper plate (not depicted) is configured to be movable relative to the cavity insert 56 and the core insert 60, when the mold is arranged in an open configuration, whereby the slide pair, and the complementary split mold inserts mounted thereon, can be laterally driven, via a cam arrangement (not shown) or any other suitable known means, for the release of the molded article from the molding cavity 62.

Several types of the split mold insert pair 54 are known in the art. For example, the split mold insert pair 54 can be of a cavity-lock type or a core-lock type (depicted in FIG. 1), depending on an arrangement that is used for locking the split mold insert pair 54, in use, relative to the mold cavity insert 56 and the core insert 60. The split mold insert pair 54 can also define a portion of the neck region (as is the case in FIG. 1) or the whole of the neck region or, put another way, "encapsulate" the neck region. One of the functions performed by the split mold insert pair 54 is to assist in ejecting the molded article off the core insert 60 by "sliding" the molded article off the core insert 60.

An example of the latter is disclosed in a co-owned U.S. Pat. No. 6,989,124 issued on Jan. 24, 2006 to Miller et al., which teaches an injection molding method and apparatus for ejecting a molded plastic article from a mold. A lifting structure and/or step is provided with a lifting portion which is configured to contact substantially one half of an end of the molded plastic article along a line substantially perpendicular to the lifting direction. Since the molded plastic article is lifted by its end, the article does not have to be solidified at its interior, thus allowing earlier removal of the article from the mold, reducing cycle time. A tapered surface forms an acute angle with respect to the lifting portion to form a tight seal with the mold, preventing leakage. Preferably, the neck ring engages only an outer circumferential portion of the molded plastic article during a majority of a mold opening stroke.

Co-owned U.S. Pat. No. 7,128,865 issued to Martin on October 31, 206 discloses an injection molding method and apparatus for ejecting a molded plastic preform from a mold. A first lifting structure and/or step is configured to have an inner surface with an area for sealing and aligning with a complementary surface on a core, and to have an upper surface with an area for sealing and aligning with a complementary surface on a second lifting structure, said upper surface of said first lifting structure being configured to lift a molded plastic preform from the injection mold in a lifting direction for a first period of time, the lower portion of the molded plastic preform lying in a plane substantially perpendicular to the lifting direction. A second lifting structure and/or step is configured to have an inner surface configured to lift an outer surface of the molded plastic preform from the injection mold in the lifting direction for a second period of time, the outer surface of the molded plastic preform including structure lying in a plane substantially parallel with the lifting direction. Since the molded plastic preform is lifted by its end, the preform does not have to be solidified at its interior, thus allowing earlier removal of the preform from the mold, reducing cycle time.

SUMMARY OF THE INVENTION

According to a first broad aspect of the present invention, there is provided a stripper assembly for use in a mold stack for forming a preform suitable for blow-molding into a final-shaped container. The stripper assembly comprises a stripper plate connectable, in use, to a stripper plate actuator; neck rings configured to cooperate to define a portion a neck region of the preform; a stripper ring configured to define at least a portion of a top sealing surface of the neck region of the preform; the stripper plate being configured to actuate the neck rings and the stripper ring, in unison, along substantially the whole length of a complete ejection path, which is substantially parallel to a longitudinal axis of the mold stack; and wherein the neck rings are configured for movement in a direction substantially perpendicular to the longitudinal axis of the mold stack, over at a portion of the complete ejection path, whereby at a completion of the complete ejection path, the stripper ring and the neck rings render the preform removable from the mold stack.

According to a second broad aspect of the present invention, there is provided a mold stack for forming a preform suitable for blow-molding into a final-shaped container. The mold stack comprises a core insert and a cavity insert cooperating to define a molding cavity to form a portion of the preform; a stripper assembly for removing the preform from the core insert, the stripper assembly comprising: a stripper plate connectable, in use, to a stripper plate actuator; neck rings configured to cooperate to define a portion a neck region of the preform; a stripper ring configured to define at least a portion of a top sealing surface of the neck region of the preform; the stripper plate being configured to actuate the neck rings and the stripper ring, in unison, along substantially the whole length of a complete ejection path, which is substantially parallel to a longitudinal axis of the mold stack; and wherein the neck rings are configured for movement in a direction substantially perpendicular to the longitudinal axis of the mold stack, over at a second portion of the complete ejection path, whereby at a completion of the complete ejection path, the stripper ring and the neck rings render the preform removable from the mold stack.

These and other aspects and features of non-limiting embodiments of the present invention will now become apparent to those skilled in the art upon review of the following description of specific non-limiting embodiments of the invention in conjunction with the accompanying drawings.

BRIEF DESCRIPTION OF THE DRAWINGS

A better understanding of the non-limiting embodiments of the present invention (including alternatives and/or variations thereof) may be obtained with reference to the detailed description of the non-limiting embodiments along with the following drawings, in which:

FIG. 4 and FIG. 5 depict the mold stack 202 of FIG. 2 and FIG. 3, the mold stack 202 being depicted in a partially extended configuration, where a stripper assembly 212 has traveled a portion of a complete ejection path.

DETAILED DESCRIPTION OF THE PREFERRED EMBODIMENT(S)

Figure 3:
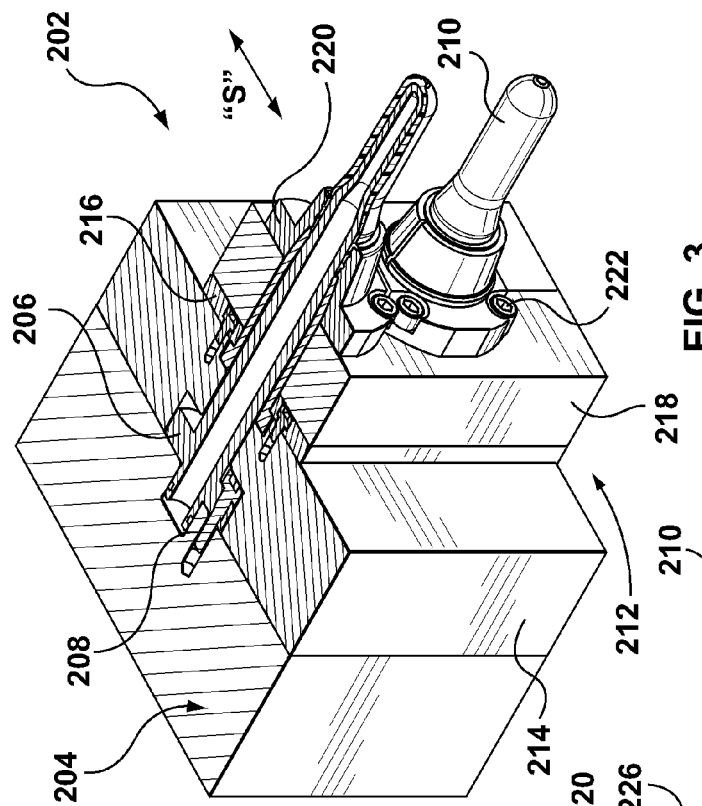
FIG. 2 and FIG. 3 depict a mold stack 202, implemented in accordance with a non-limiting embodiment of the present invention, the mold stack 202 being depicted in a molding configuration.
Figure 2:
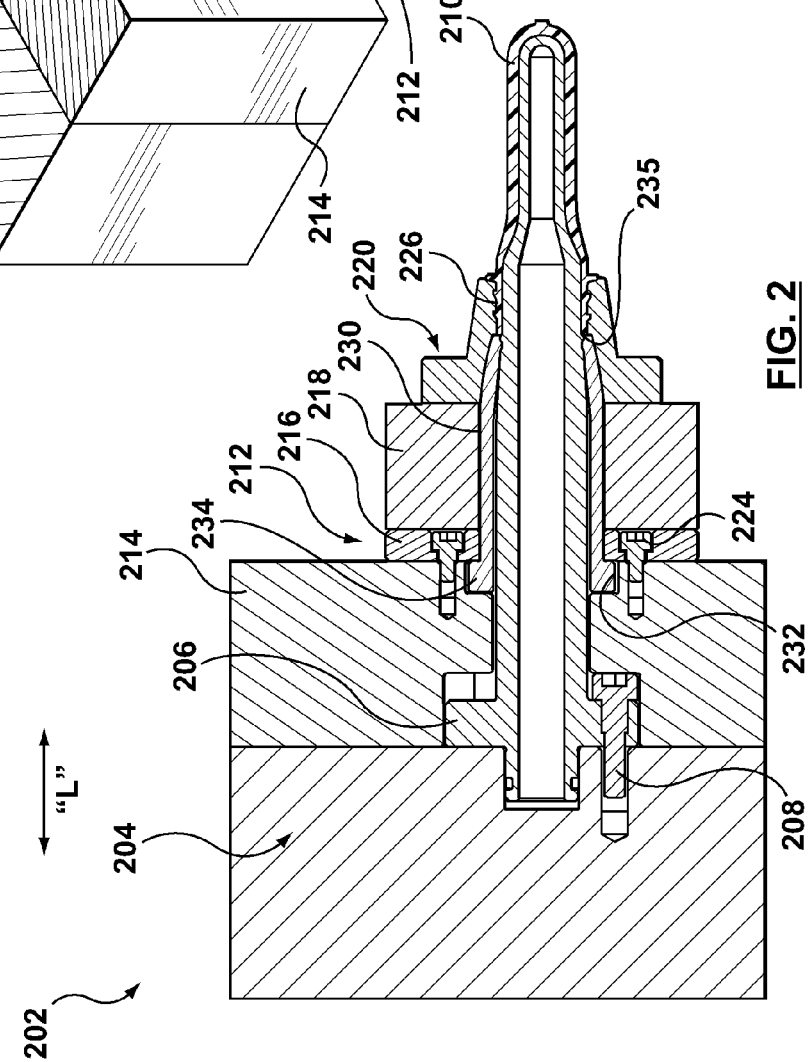

With reference to FIG. 2 and FIG. 3, a non-limiting embodiment of a mold stack 202 will now be described in greater detail, in which FIG. 2 depicts a cross section taken along a longitudinal axis thereof and FIG. 3 depicts a perspective view of a first instance and a partially cut-out second instance thereof.

Figure 1:
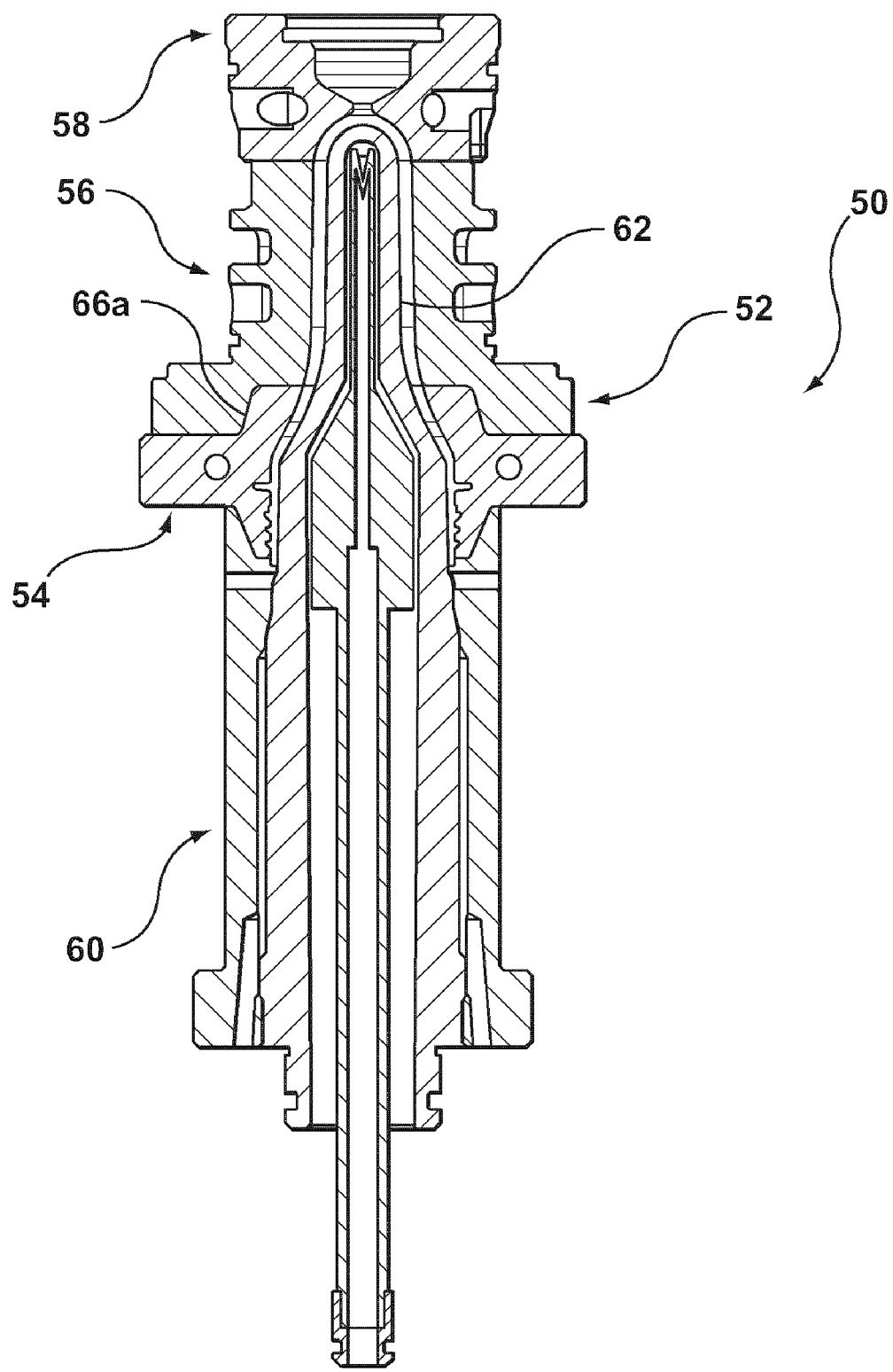
FIG. 1 is a cross-section view of a portion of an injection mold 50 that incorporates a typical molding insert stack assembly 52, implemented in accordance with known techniques.

The mold stack 202 is receivable in use within a core plate 204, which is implemented according to conventional designs and, as such, will not be described in great detail herein. More specifically, coupled to the core plate 204 is a core insert 206. Construction of the core insert 206 can be implemented in accordance with known techniques and, as such, will not be described in great detail herein. Suffice it to say that the core insert 206 can be coupled to the core plate 204 by means of a suitable coupler, such as a bolt 208 and the like. Function of the core insert 206 is also well-known in the art and includes inter alia the function of defining an inner portion of a preform 210, the preform 210 being of a kind suitable for subsequent blow-molding into a final-shaped container, such as a beverage container or the like. Even though not depicted, the mold stack 202 further includes a cavity insert, which cooperates with the core insert 206 to define portions of a molding cavity that forms the preform 210. The cavity insert can be implemented in a substantially similar manner to the mold cavity insert 56 of FIG. 1.

The mold stack 202 further includes a stripper assembly 212. Within the embodiment illustrated, the stripper assembly 212 includes a stripper plate 214, a wear plate 216, two instances of a neck ring slide 218 (referred together as neck ring slides 218) and neck rings 220. The stripper plate 214 is operatively coupled to a stripper plate actuator, which is not depicted, but is well-known to those of skill in the art (for example, a hydraulic actuator, a servo-motor actuator and the like). The stripper plate actuator (not depicted) is configured to move the stripper plate, back and forth, in a direction depicted in FIG. 2 at "L" or, in other words, a direction, which is substantially parallel to the longitudinal axis of the mold stack 202.

Within the illustration, the neck rings 220 are of a cavity-lock type. The neck rings 220 perform at least two functions—defining a portion of a neck region 226 of the preform 210 and assisting in ejection of the preform 210 off the core insert 206. For the performance of the ejection function, the neck rings 220 are operatively coupled to the neck ring slides 218 by suitable means, such as bolts 222 (shown in FIG. 3), for movement therewith as will be described momentarily. The neck ring slides 218 are coupled to a neck ring slide actuator (not depicted), which can be implemented as cam(s), servo motor(s) and the like. The neck ring slide actuator (not depicted) is configured to move the neck ring slides 218, back and forth, in a direction depicted in FIG. 3 at "S" or in other words a direction which is substantially perpendicular to a longitudinal axis of the mold stack 202. The wear plate 216 is provided between the stripper plate 214 and the neck ring slides 218 to prevent substantial damage to the stripper plate 214 and/or neck ring slides 218 during the movement of the neck ring slides 218 relative to the stripper plate 214 in the direction "S". The wear plate 216 is implemented according to known techniques and is coupled to the stripper plate 214 by suitable couplers, such as bolts 224 and the like.

So far, implementation of the stripper assembly 212 is substantially similar to that of the prior art approaches. Accordingly, those skilled in the art will easily appreciate how the stripper assembly 212 functions. However, for the benefit of the reader, a brief description will be presented. It is worthwhile noting that FIG. 2 and FIG. 3 depict the mold stack 202 in a "molding configuration". The molding configuration is a configuration whereby a mold (not depicted) housing the mold stack 202 and the aforementioned cavity insert (not depicted), as well as other stack components potentially present therein, is closed (and, potentially, clamped) and the preform 210 is being molded or, as is the case in FIGS. 2 and 3, the preform 210 has been molded and either undergoes or has undergone in-mold cooling.

When a mold (not depicted) housing the mold stack 202 is unclamped and starts to open, the stripper plate actuator (not depicted) actuates the stripper plate 214 in a right-bound direction, as viewed in FIG. 2. The wear plate 216, the neck ring slides 218 and the neck rings 220 initially start to move, in unison, with the stripper plate 214, effectively moving the preform 210 in the right-bound direction, so that it can be eventually removed from the core insert 206. After a certain portion of this movement (which is determined, amongst other things, by the length of the preform 210, etc.), the neck ring slides actuator (not depicted) starts to actuate the neck ring slides 218 (and, therefore, the neck rings 220) outwardly into the direction "S". At this point, the wear plate 216, the neck ring slides 218 and the neck rings 220 continue to move in the direction "L", while the neck ring slides 218 and the neck rings 220 also move in the direction "S". Eventually, the two halves of the neck rings 220 are separated enough to let the neck region 226, which includes several undercuts such as a thread, an anti-tampering ledge, etc. (all of these undercuts not separately numbered), of the preform 210 to be removed from the mold stack 202.

Eventually, the preform 210 is removed from the core insert 206 and is transferred to a suitable downstream processing device (not depicted), such as a take-off robot (not depicted) and the like. It is worthwhile noting that a path of travel traveled by the stripper assembly 212, in the direction "L" (i.e. the longitudinal direction) between the position showed in FIG. 2 and a position where the preform 210 is removed from the core insert 206, can be thought of as a "complete ejection path" of the stripper assembly 212.

According to a non-limiting embodiment of the present invention, the stripper assembly 212 further comprises a stripper ring 230. The stripper ring 230 is coupled to the stripper plate 214 for movement therewith, back and forth, in the direction "L" (FIG. 2). Therefore, it is noted that both the stripper ring 230 and the neck ring slides 218 (and, therefore, the neck rings 220) are actuated in the direction "L" by the same means, i.e. by means of the stripper plate 214 (and the stripper plate actuator, which is not depicted).

In the specific non-limiting embodiment of the present invention depicted in FIG. 2 and FIG. 3, the stripper ring 230 is coupled to the stripper plate 214 in the following manner. Defined between the stripper plate 214 and the wear plate 216 is a pocket 232. The stripper ring 230, on the other hand, comprises an annular step 234, which is complementary in shape to the pocket 232. Recalling that the wear plate 216 is coupled to the stripper plate 214 by means of bolts 224, when assembled, the annular step 234 gets trapped within the pocket 232. Within the specific embodiment depicted herein, the specific coupling arrangement affords a certain degree of float to the stripper ring 230, which may compensate for any ads-alignment potentially present between components of the mold stack 202. Therefore, it can be said that within this embodiment of the present invention, the stripper ring 230 is coupled to the stripper plate 214 in a floatable arrangement. However, in alternative non-limiting embodiments of the present invention, the coupling between the stripper ring 230 and the stripper plate 214 can be executed by different means, such as by means of bolts or other suitable couplers (which may, but do not have to, afford the same or different degree of float to the stripper ring 230).

The stripper ring 230 includes a molding cavity defining portion 235, which in use defines a portion of the preform 210 or, more specifically, a top portion of the neck region 226, also known in the art as "TSS" or "Top Sealing Surface".

Within the context of operation of the stripper assembly 212 presented above, operation of the stripper ring 230 will be explained in greater detail with reference to FIG. 2 and FIG. 3 (depicting a molding configuration thereof), FIG. 4 and FIG. 5 (depicting a configuration where the mold stack 202 is in a partially extended configuration, where the stripper assembly 212 has traveled a portion of the complete ejection path) and FIG. 6 and FIG. 7 (depicting a configuration where the mold stack 202 is in a fully extended configuration, where the stripper assembly 212 has traveled the whole of the complete ejection path). It is worthwhile noting that some of the numerals shown in FIG. 2 and FIG. 3 have been omitted, for the sake of simplicity, from FIG. 4, FIG. 5, FIG. 6 and FIG. 7.

For the purposes of the description to be presented herein below, it shall be assumed that within the illustration of FIG. 2 and FIG. 3, the mold stack 202 is shown in the molding configuration where the preform 210 has been molded and has undergone in-mold cooling. At this point, the mold (not depicted) housing the mold stack 202 is unclamped and starts to open and the stripper plate actuator (not depicted) actuates the stripper plate 214 in a right-bound direction, as viewed in FIG. 2. The wear plate 216, the neck ring slides 218, the neck rings 220 and the stripper ring 230 initially start to move, in unison, with the stripper plate 214, effectively moving the preform 210 in the right-bound direction along a portion of the complete ejection path (i.e. in the direction "L"). This portion of the complete ejection path, where the neck rings 220 and the stripper ring 230 are moving in unison can be considered to be "a first portion" of the complete ejection path.

With reference to FIG. 4 and FIG. 5, after a certain portion of this movement (which is determined, amongst other things, by the length of the preform 210, etc.), the neck ring slides actuator (not depicted) starts to actuate the neck ring slides 218 (and, therefore, the neck rings 220) outwardly into the direction "S" (FIG. 5). This portion of the complete ejection path can be considered to be a beginning of a "second portion" of the complete ejection path, where the wear plate 216, the neck ring slides 218, the neck rings 220 and the stripper ring 230 continue the movement in the right-bound portion of the direction "L", while the neck ring slides 218 and the neck rings 220 continue the movement in the outbound portion of the direction "S".

Figure 6:
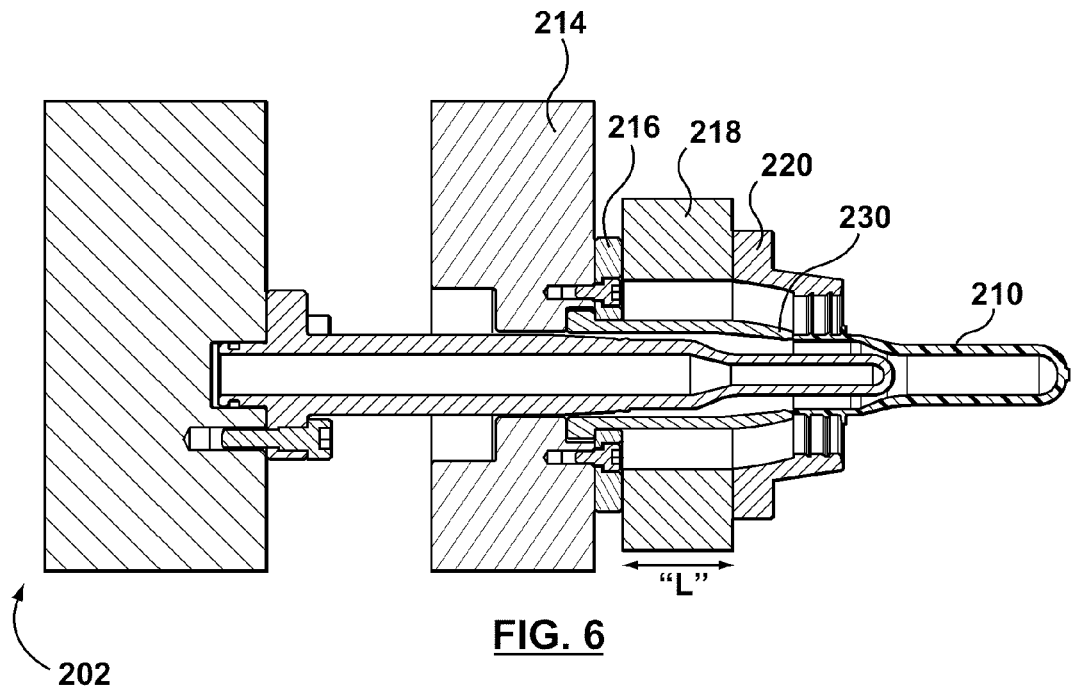
FIG. 6 and FIG. 7 depict the mold stack 202 of FIG. 2 and FIG. 3, the mold stack 202 being depicted in an extended configuration, where the stripper assembly 212 has traveled the whole of the complete ejection path.
Figure 7:
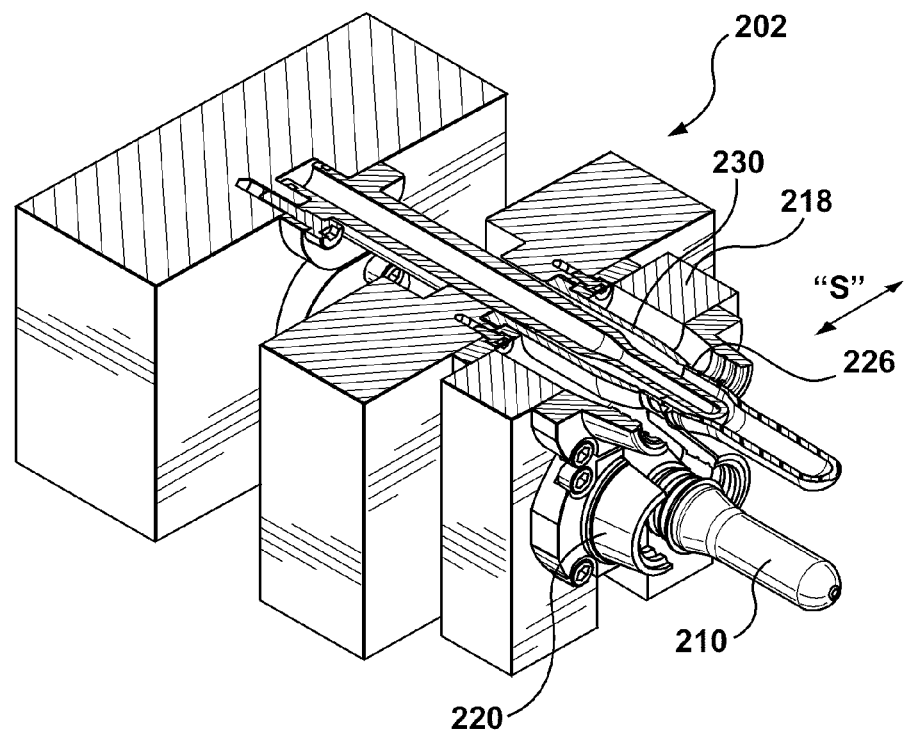

FIG. 6 and FIG. 7 depict the mold stack 202 in a position where the mold stack 202 has completed the whole of the complete ejection path. At this point, the wear plate 216, the neck ring slides 218, the neck rings 220 and the stripper ring 230 have completed the movement in the right-bound portion of the direction "L" (FIG. 6), while the neck ring slides 218 and the neck rings 220 also have completed the movement in the outbound portion of the direction "S" (FIG. 7). As a result of this, the two halves of the neck rings 220 have been separated enough to allow the neck region 226 of the preform 210 to be removed from the mold stack 202. In other words, at a completion of the complete ejection path, the preform 210 is rendered removable from the mold stack 202.

This sequence of actuation of the neck rings 220 and the stripper ring 230 results in a technical effect of embodiments of the present invention whereby both the stripper ring 230 and the neck rings 220 assist in ejection of the preform 210 off the core insert 206. More specifically, during the first portion of the complete ejection path, both the stripper ring 230 and the neck rings 220 assist in moving the preform 210 off the core insert 206. During the second portion of the complete ejection path, the stripper ring 230 continues to move the preform 210 off the core insert 206, while halves of the neck rings 220 are separated to render the preform 210 demoldable. For the avoidance of doubt, s should be understood that the neck rings 220 are actuated in the direction "S" only during a portion of the complete ejection path, i.e. during the aforementioned second portion thereof.

It is noted that within this illustration, the neck ring slides 218 and the stripper ring 230 are both actuated by the same actuator (i.e. the stripper plate 214 and the stripper plate actuator, which is not depicted) and they have also traveled together in the longitudinal direction (i.e. direction "L") for substantially the whole length of the complete ejection path. It is also worthwhile noting and recalling that the stripper ring 230 defines a portion of the preform 210 (and more specifically a portion of the top sealing surface), the stripper ring 203 effectively "pushes" the preform 210 off the core insert 206 during the movement along the complete ejection path.

A technical effect of embodiments of the present invention includes at least partial mitigation of certain demolding defects, attributable at least partially to the pushing exerted by the stripper ring 230 onto the top portion of the preform 210 (and, more specifically, onto a portion of the Top Sealing Surface of the preform 210). Another technical effect of embodiments of the present invention includes simplicity of assembly, which is attributable at least partially to the fact that the neck ring slides 218 and the stripper ring 230 are actuated by a single actuator (i.e. the stripper plate 214 and the stripper plate actuator, which is not depicted).

It is noted that embodiments described herein above are meant as examples only. Constructions of certain components of the mold stack 202 can be varied and certain other components can be omitted altogether. For example, in certain embodiments of the present invention, the wear plate 216 can be omitted from the mold stack 202.

Description of the non-limiting embodiments of the present inventions provides examples of the present invention, and these examples do not limit the scope of the present invention. It is to be expressly understood that the scope of the present invention is limited by the claims. The concepts described above may be adapted for specific conditions and/or functions, and may be further extended to a variety of other applications that are within the scope of the present invention. Having thus described the non-limiting embodiments of the present invention, it will be apparent that modifications and enhancements are possible without departing from the concepts as described. Therefore, what is to be protected by way of letters patent are limited only by the scope of the following claims:

What is claimed is:

1. A stripper assembly for use in a mold stack for forming a preform suitable for blow-molding into a final-shaped container, the stripper assembly comprising:
   a stripper plate connectable, in use, to a stripper plate actuator;
   neck rings configured to cooperate to define a portion of a neck region of the preform;
   a stripper ring configured to define at least a portion of a top sealing surface of the neck region of the preform;
   the stripper plate being configured to actuate the neck rings and the stripper ring, in unison, along substantially the whole length of a complete ejection path, which is substantially parallel to a longitudinal axis of the mold stack; and wherein
   the neck rings are configured for movement in a direction substantially perpendicular to the longitudinal axis of the mold stack, over at least a portion of the complete ejection path,
   whereby at a completion of the complete ejection path, the stripper ring and the neck rings render the preform removable from the mold stack.

2. The stripper assembly of claim 1, wherein the stripper ring is coupled to the stripper plate in a floatable arrangement.

3. The stripper assembly of claim 2, wherein
   the neck rings are coupled to a neck ring slide; and wherein the stripper assembly further comprises
   a wear plate disposed between the stripper plate and the neck ring slide; and wherein, in use
   the stripper plate and the wear plate define a pocket; and wherein the stripper ring comprises an annular step complementary in shape to the pocket; and wherein, in use
   the stripper plate and the wear plate trap the annular step within the pocket.

4. The stripper assembly of claim 1, wherein the stripper plate is coupled, in use, to the stripper plate actuator which is configured to actuate the stripper plate along the longitudinal axis of the mold stack.

5. The stripper assembly of claim 1, wherein the neck rings are coupled to a neck ring slide; and wherein the neck ring slide is coupled, in use, to a neck ring slide actuator and wherein the neck ring slide actuator is configured to actuate the neck ring slide in a direction substantially perpendicular to the longitudinal axis of the mold stack.

6. A mold stack for forming a preform suitable for blow-molding into a final-shaped container, the mold stack comprising:
   a core insert and a cavity insert cooperating to define a molding cavity to form a portion of the preform;
   a stripper assembly for removing the preform from the core insert, the stripper assembly comprising:
      a stripper plate connectable, in use, to a stripper plate actuator;
      neck rings configured to cooperate to define a portion of a neck region of the preform;
      a stripper ring configured to define at least a portion of a top sealing surface of the neck region of the preform;
      the stripper plate being configured to actuate the neck rings and the stripper ring, in unison, along substantially the whole length of a complete ejection path, which is substantially parallel to a longitudinal axis of the mold stack; and wherein
      the neck rings are configured for movement in a direction substantially perpendicular to the longitudinal axis of the mold stack, over at least a second portion of the complete ejection path, whereby at a completion of the complete ejection path, the stripper ring and the neck rings render the preform removable from the mold stack.

7. The mold stack of claim 6, wherein the stripper ring is coupled to the stripper plate in a floatable arrangement.

8. The mold stack of claim 7, wherein
the neck rings are coupled to a neck ring slide; and wherein the stripper assembly further comprises
a wear plate disposed between the stripper plate and the neck ring slide; and wherein, in use
the stripper plate and the wear plate define a pocket; and wherein the stripper ring comprises an annular step complementary in shape to the pocket; and wherein, in use
the stripper plate and the wear plate trap the annular step within the pocket.

9. The mold stack of claim 6, wherein the stripper plate is coupled, in use, to the stripper plate actuator which is configured to actuate the stripper plate along the longitudinal axis of the mold stack.

10. The mold stack of claim 6, wherein the neck rings are coupled to a neck ring slide; and wherein the neck ring slide is coupled, in use, to a neck ring slide actuator and wherein the neck ring slide actuator is configured to actuate the neck ring slide in a direction substantially perpendicular to the longitudinal axis of the mold stack.

* * * * *